United States Patent [19]

Snell et al.

[11] Patent Number: 5,299,470
[45] Date of Patent: Apr. 5, 1994

[54] IGNITION INTERLOCK MECHANISM FOR A COLUMN-MOUNTED SHIFT CONTROL ASSEMBLY

[75] Inventors: William M. Snell, Grand Blanc; David E. Thomas, Rochester Hills; Michael F. Halacka, Bloomfield Hills, all of Mich.

[73] Assignee: Chrysler Corporation, Highland Park, Mich.

[21] Appl. No.: 993,550

[22] Filed: Dec. 21, 1992

[51] Int. Cl.⁵ .................... B60K 41/04; G05G 5/08
[52] U.S. Cl. .................. 74/850; 74/483 R; 70/248
[58] Field of Search ............. 74/475, 483 R, 850; 70/247, 248

[56] References Cited

U.S. PATENT DOCUMENTS

| | | | |
|---|---|---|---|
| 4,724,722 | 2/1988 | Beauch et al. | 74/483 R X |
| 4,821,605 | 4/1989 | Dzioba | 74/850 |
| 4,854,193 | 8/1989 | Newman et al. | 74/850 |
| 5,040,434 | 8/1991 | Behrens | 74/850 |

Primary Examiner—Allan D. Herrmann
Attorney, Agent, or Firm—Edward P. Barthel

[57] ABSTRACT

A column-mounted shift control assembly includes a gate and mounting bracket, a shift lever unit rotatably mounted on the bracket, a shift handle pivotally mounted on the shift lever unit, and resilient means for urging the terminal end of the shift handle toward the bracket. The latter includes a planar gate portion having detents formed on an edge thereof for selective cooperation with the shift handle terminal end to select a desired transmission shift position. An ignition interlock mechanism cooperates with the terminal end of the shift handle to prevent its movement out of the Park detent position unless the ignition switch key is turned on, and further prevents the ignition switch from being turned back to Lock unless the terminal end is in Park position, thus preventing key extraction.

10 Claims, 7 Drawing Sheets

IGNITION INTERLOCK MECHANISM FOR A COLUMN-MOUNTED SHIFT CONTROL ASSEMBLY

TECHNICAL FIELD

This invention relates generally to vehicle transmission column-mounted shift control assemblies and, more particularly, to ignition interlock mechanisms therefor.

BACKGROUND ART

A known ignition interlock mechanism for a column-mounted shift control assembly is disclosed in Dzioba U.S. Pat. No. 4,821,605. This mechanism includes a latch plate pivotally mounted on an end of an arcuate shaped detent plate. The latch plate has a locking surface which is selectively positioned via the interaction of a key cylinder slot, a lock pin, a ramped plunger, and a cable to prevent removal of an operator lever positioning arm from the Park position prior to the key cylinder being unlocked. The latch plate also includes a positioning surface which, when engaged by the positioning arm upon its return to Park position, will pivot the latch plate to thereby move the plunger and permit the lock pin to leave the key cylinder slot and permit the key to be returned to its lock and remove position.

DISCLOSURE OF THE INVENTION

A general object of the invention is to provide an improved ignition interlock mechanism for a column-mounted vehicle transmission shift control assembly, serving to prevent removal of the shift control mechanism from its Park position prior to unlocking the ignition lock, and to further prevent the removal of the key from the key cylinder prior to the return of the shift control mechanism to the Park position.

Another object of the invention is to provide an ignition interlock mechanism for a column-mounted transmission control assembly, and including a key cylinder rotatable by a key, a projection formed on the key cylinder, a spring-loaded actuator member adapted to being engaged by the projection, a blocker member pivotally mounted on the detent plate, linkage means operatively connected between the actuator member and the blocker member to prevent the end of the shift lever from being pivoted out of the Park detent until the key cylinder is rotated by the key.

A further object of the invention is to provide an ignition interlock mechanism including a shift control unit rotatable by the shift lever and having provisions thereon for alternately blocking rotation of the shift lever until the key is rotated, and blocking the key cylinder until the shift lever is returned to Park position.

Still another object of the invention is to provide an ignition interlock mechanism, wherein provisions for alternately blocking rotation of the shift lever until the key is rotated, and blocking the key cylinder until the shift lever is returned to Park position include an actuator member pivotable by rotation of the key cylinder, a projection formed on the actuator member, a blocker member pivotally mounted on the detent plate, a linkage rod pivotally connected between the actuator member and the blocker member adapted to cause the blocker member to prevent pivoting the terminal end of the shift lever from its Park position until the key cylinder is rotated from its locked position by the key, and a partial circle abutment formed on a shift lever unit rotatable by the shift lever adapted to block the projection on the actuator member until the shift lever terminal end is returned to the Park position to thereby free the key cylinder to be returned to the key release position.

A still further object of the invention is to provide a preferred alternate ignition interlock mechanism, wherein the provisions for alternately blocking rotation of the shift lever until the key is rotated, and blocking the key cylinder until the shift lever is returned to Park position include an actuator member pivotable by rotation of the key cylinder, a projection formed on the actuator member, a blocker member pivotally mounted on the detent plate, an inhibit rod pivotally connected between the actuator member and the blocker member adapted to cause the blocker member to prevent pivoting the terminal end of the shift lever from its Park position until the key cylinder is rotated from its locked position by the key, and a spring-loaded inhibit blocker pivotally mounted on the detent plate adapted to block the projection on the actuator member until the shift lever terminal end is returned to the Park position to thereby free the key cylinder to be returned to the key release position.

These and other objects and advantages will become more apparent when reference is made to the following drawings and the accompanying description.

BEST MODE OF CARRYING OUT THE INVENTION

Figure 1:
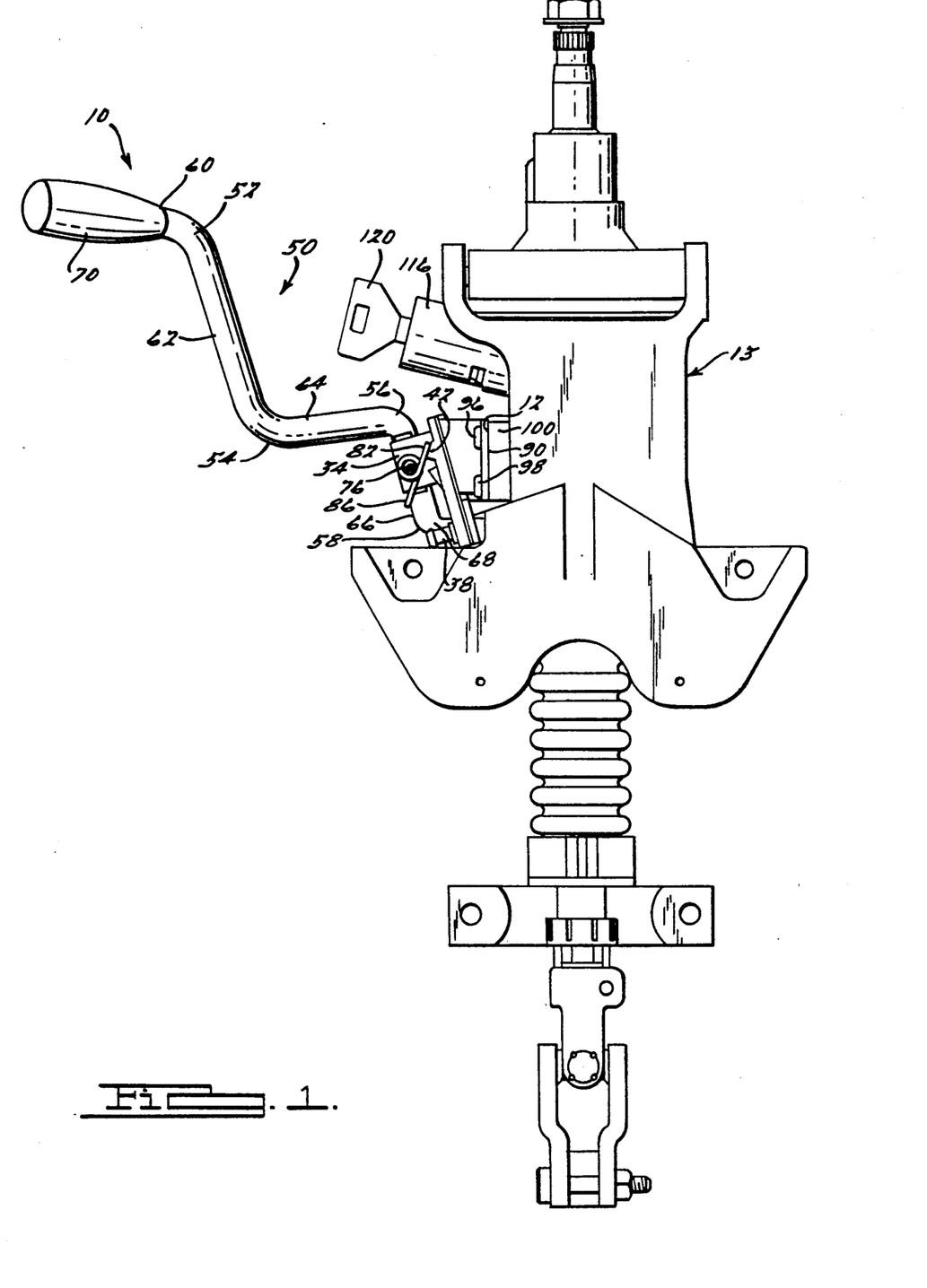
FIG. 1 is front view of a vehicle steering column embodying the invention.
Figure 2:
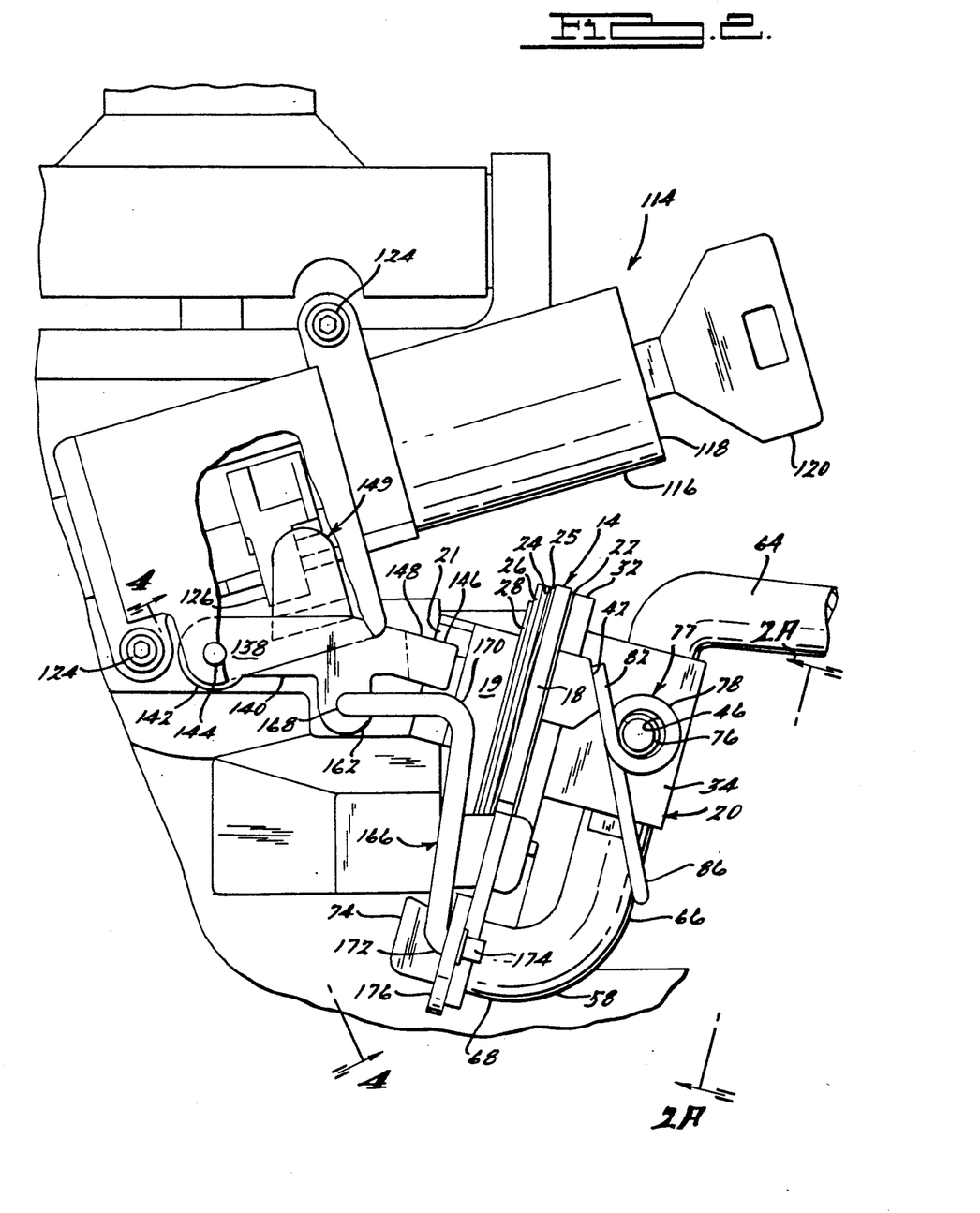
FIG. 2 is an enlarged end view of a portion of the FIG. 1 structure, as viewed from the rear, or by the operator.

Referring now to the drawings in greater detail, FIGS. 1-7 illustrate a vehicle gear shift mechanism 10 mounted on a predetermined surface 12 of a steering column 13 (FIG. 1). The gear shift mechanism 10 includes an integral gate and mounting bracket 14 having a mounting opening 16 formed in a planar body portion 18, and mounted around a cylindrical hub 19 extending from a shift lever unit 20. A partial circle abutment 21 is formed on the inner end of the hub 19 for a purpose to be described. As shown in FIG. 2, the planar body portion 18 is confined between two wear washers 22 and 24. As shown in FIGS. 2 and 4-7, a wave washer 25 is confined between the wear washer 24 and a flat steel washer 26. The planar body portion 18 is retained on the hub 19 by the washer 24/25/26 arrangement which, in turn, is retained on the hub 19 by a C-clip 28 mounted in an annular groove (not shown) formed adjacent the distal end of the hub 19.

Figure 2A:
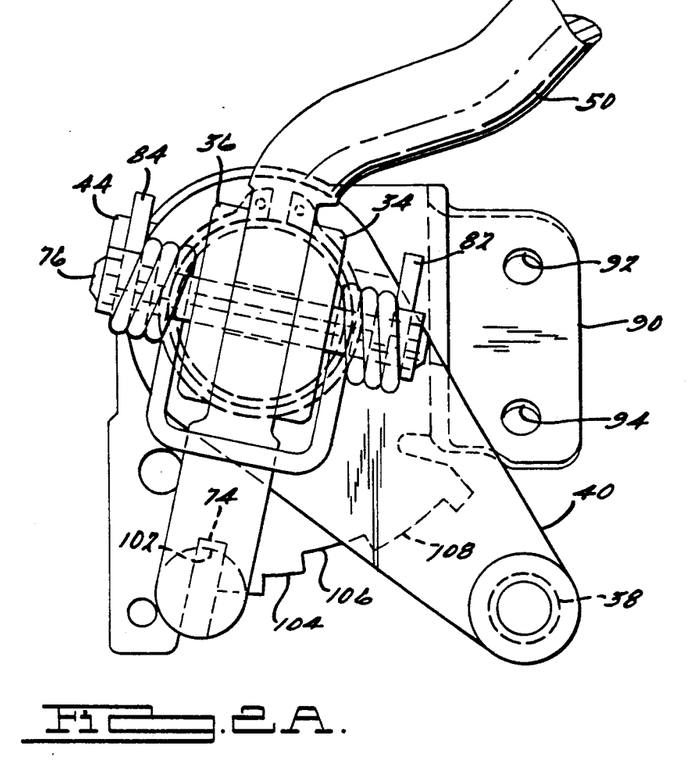
FIG. 2A is a view taken along the plane of the line 2A—2A of FIG. 2, and looking in the direction of the arrows.

The wear bushing 22 abuts against a partially round body portion 32 (FIG. 2) of the shift lever unit 20. A pair of spaced-apart mounting flanges 34 and 36 (FIG. 2A) are formed on the body portion 32, on the side opposite the wear bushing 22, so as to extend perpendicularly therefrom.

A shift cable mounting lug 38 (FIGS. 4-7) is provided adjacent the end of an elongated extension 40 of the body portion 32. A pair of spring retainer abutments 42 and 44 (FIG. 2A) are formed on the body portion 32, extending outwardly from the respective flanges 34 and 36. A pair of aligned openings 46 and 48 are formed through a central portion of the respective flanges 34 and 36.

A shift lever 50 includes bend portions 52, 54, 56, and 58 formed along its length to provide segments 60, 62, 64, 66, and 68. A hand grip 70 is provided on the first end segment 60, and a hole 72 (FIG. 2A) is formed through the segment 66. A flat-sided terminal end 74 is formed on the distal end of the segment 68, for a purpose to be described.

A spring mounting pin 76 is extended through the opening 46, the hole 72, and the opening 48. A spring assembly 77 (FIGS. 2 and 2A) includes a pair of coil springs 78 and 80 mounted around the respective extended ends of the pin 76. An outer end coil 82 and 84 of the respective coil springs 78 and 80 is straightened to abut against the respective spring retainer abutments 42 and 44, and a central U-shaped wire portion 86 extends from the respective inner coils of the springs 78 and 80. The U-shaped wire portion 86 is urged in tension against the outer surface of the shift handle segment 66 (FIGS. 2 and 4) by the abutting outer straightened coils 82 and 84, for a purpose to be described.

The integral gate and mounting bracket 14 is formed to include a segment 88 (FIGS. 4-7) bent outwardly from the planar body portion 18, with a mounting flange 90 bent substantially perpendicularly from the outer end of the segment 88. A pair of mounting holes 92 and 94 are formed through the flange 90, and a third hole 95 through the planar body portion 18. A pair of metal screws 96 and 98 (FIG. 1) are mounted through the holes 92 and 94 and a screw 99 is mounted through the hole 95 to secure the gear shift mechanism 10 to a mounting block 100 (FIG. 1) on the steering column 13.

A plurality of gate detents 102, 104, 106, 108, 110, and 112 (FIGS. 4-7), corresponding to Park, Reverse, Neutral, Drive, Second and Low gear shift positions, respectively, are formed on an edge of the planar body portion 18 of the gate and mounting bracket 14.

Figure 4:
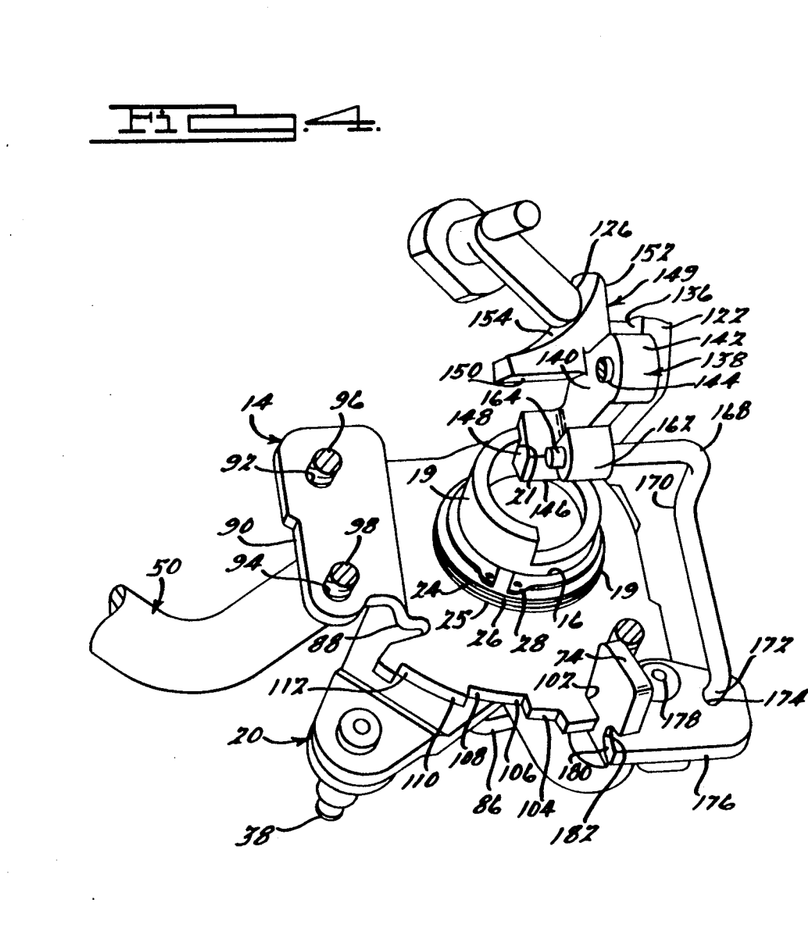
FIG. 4 is a perspective view taken substantially along the plane of the line 4—4 of FIG. 2, and looking in the direction of the arrows.

As shown in FIG. 4, the flat terminal end 74 of the shift handle 50 is adapted to extend through the Park detent 102, being retained there by the force of the central U-shaped wire portion 86 of the spring assembly 77.

As shown in FIG. 2, an ignition interlock latching mechanism 114 includes a cylindrical housing 116 enclosing a key cylinder 118, into which a key 120 is inserted and adapted to rotate the key cylinder within the housing 116. A cover 122 is secured by fasteners 124 adjacent the inner end of the key cylinder 118. A radially extending finger-like projection 126 is formed on the key cylinder beneath the cover 122.

Figure 3:
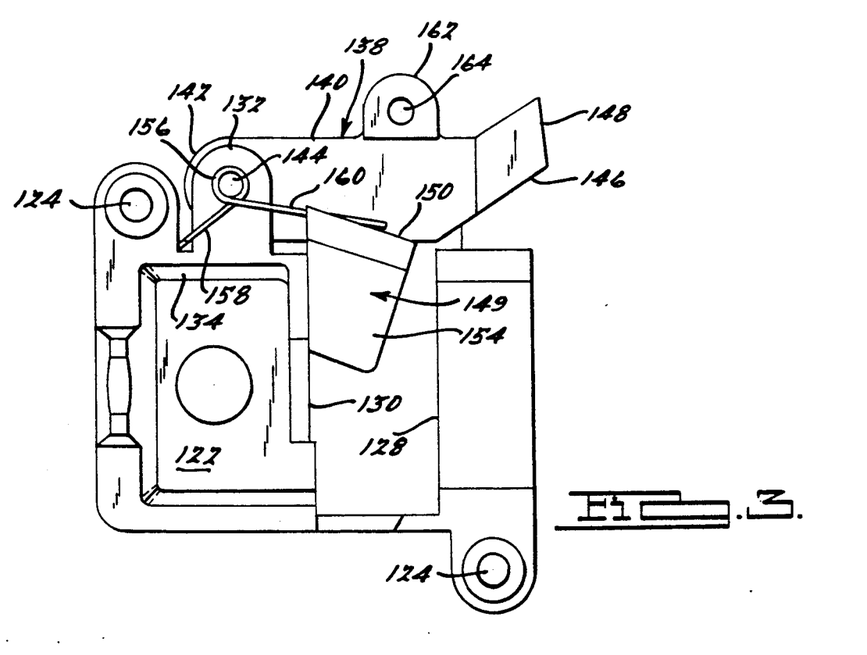
FIG. 3 is a view of a portion of the FIG. 2 structure from the inside thereof.

As shown in FIG. 3, a pair of spaced-apart walls 128 and 130 are formed perpendicularly from the inner surface of the cover 122. A laterally extending ledge 132 is formed to extend from a side wall 134, providing a space 136 adjacent the cover 122.

An actuator member 138 includes a body portion 140 having one end 142 thereof pivotally confined in the space 136 on a pivot pin 144 extended through the ledge 132 and the cover 122. A projection 146 is formed on the other end 148 of the body portion 140 for a purpose to be described. A further projection 149 is formed on the body portion 140 to include walls 150 and 152 (FIGS. 4-7) forming a right angle with one another and extending perpendicularly and laterally, respectively, from the inner edge of the body portion 140, with an arcuate surface 154 extending between the distal ends of the walls 150 and 152. The wall 152 extends between the walls 128 and 130.

A coil spring 156 (FIG. 3) is mounted around the inner extension of the pivot pin 144, with one extended end 158 of the spring 156 fitted against the edge of the ledge 132 away from the projection 148, and the other extended end 160 abutted against the wall 150 so as to urge the wall 152 into contact with the wall 130.

Figure 5:
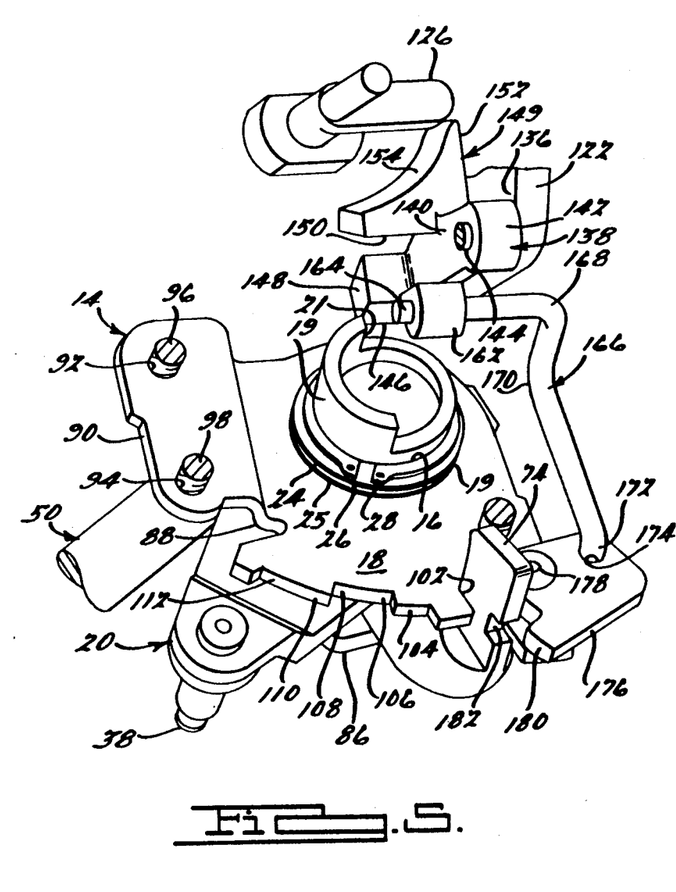
FIGS. 5-7 are views similar to FIG. 4, illustrating different operational conditions.

Another projection 162 is formed on an outer edge of the body portion 140, opposite the projection 149. Referring to FIGS. 4 and 5, and end 164 of a linkage rod 166 is pivotally mounted through the projection 162 so as to be perpendicular to the plane of the body portion 140. The rod 166 includes bends 168, 170 and 172 such that the other end 174 of the rod 166 extends through a blocker member 176 which is pivotally mounted on a pivot pin 178 through the planar body portion 18 adjacent the Park detent 102. An extension 180 is formed on an end of the blocker member 176, adaptable to being pivoted into a slot 182 formed in an edge of the flat terminal end 74 of the shift handle 50.

In operation, the terminal end 74 is retained in the Park detent 102 by the extension 180 of the blocker member 176 being positioned in the slot 182 until the key 120 is inserted into the key cylinder 118 to rotate the latter to its unlocked position. This action rotates the finger-like projection 126 away from the arcuate surface 154, which held the wall 152 into engagement with the wall 128 against the force of the spring end 160. Once the projection 126 is thus removed, the spring end 160 urges the wall 152 into engagement with the wall 130. This pivots the actuator member 138, moving the projection 146 away from the edge of the abutment 21, pulling the linkage rod 166 and, hence, pivoting the blocker member 176 and removing the extension 180 from the slot 182 to thus free the terminal end 74.

Figure 6:
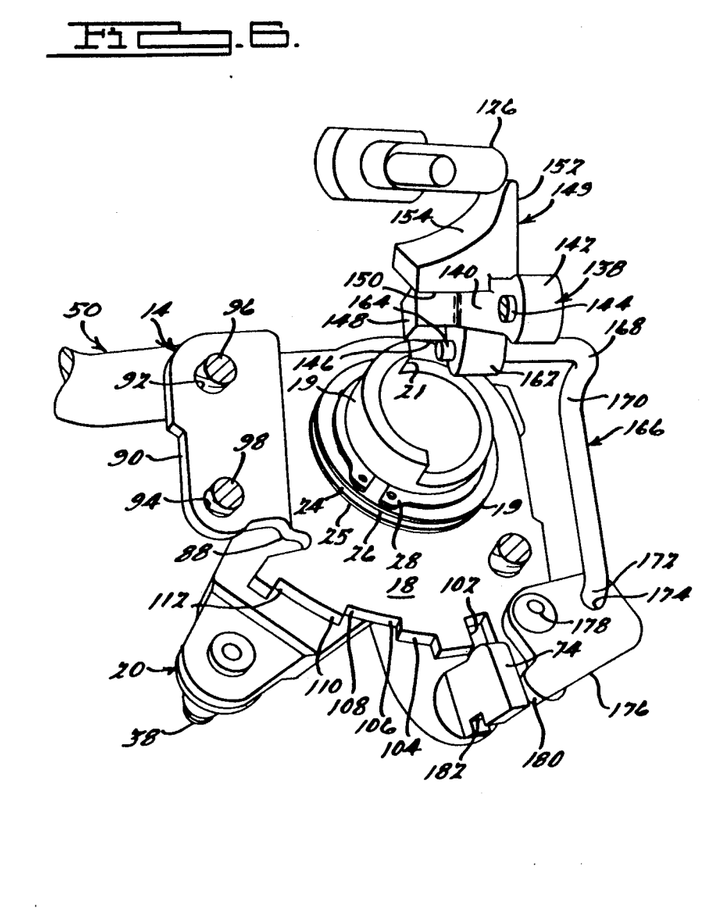
Figure 7:
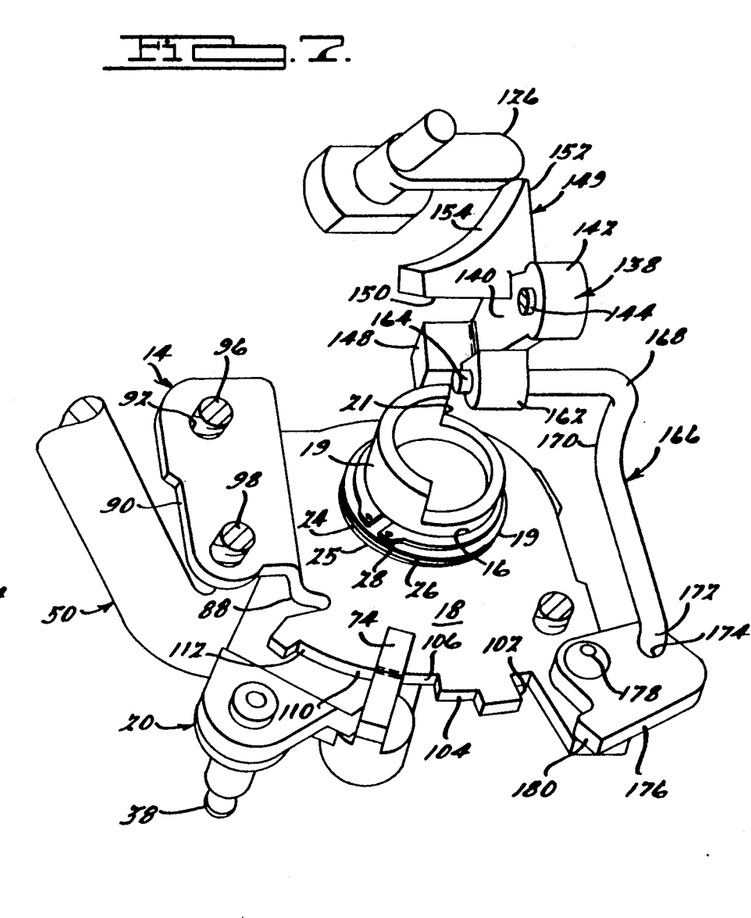
Figure 8:
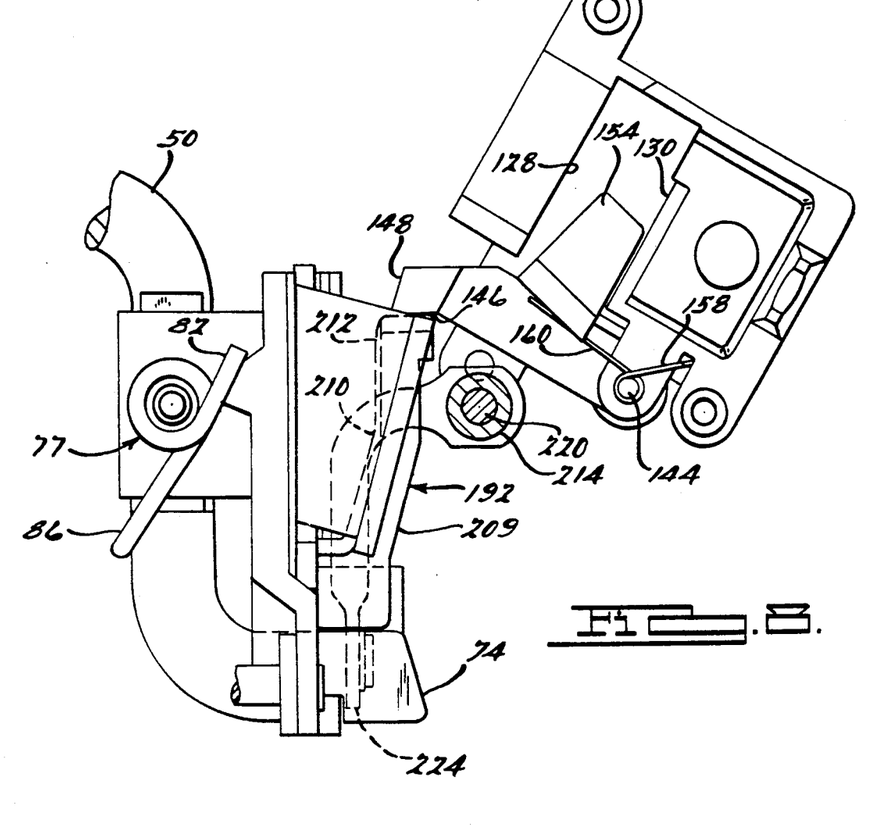
FIG. 8 is a view similar to FIG. 2, as viewed from the front, illustrating an alternate embodiment.
Figure 9:
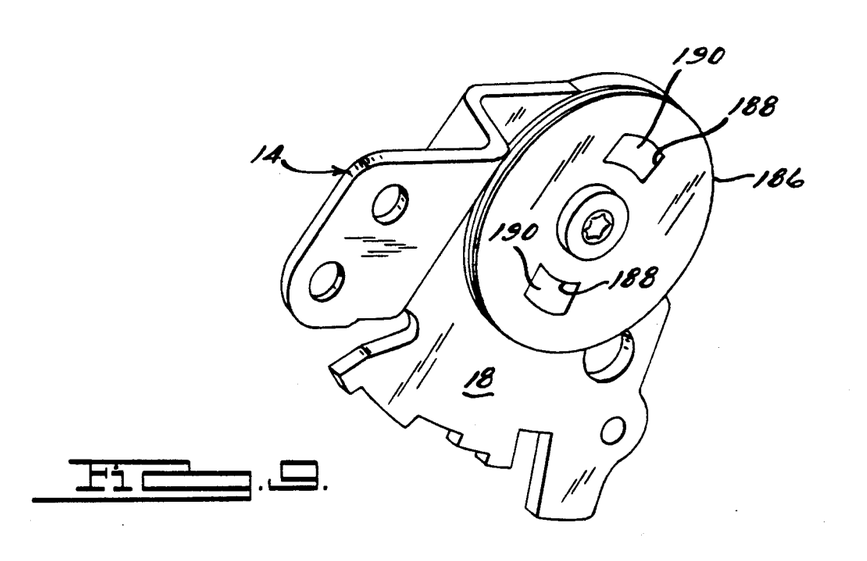
FIG. 9 is a view taken along the plane of the line 9—9 of FIG. 8, and looking in the direction of the arrows.
Figure 10:
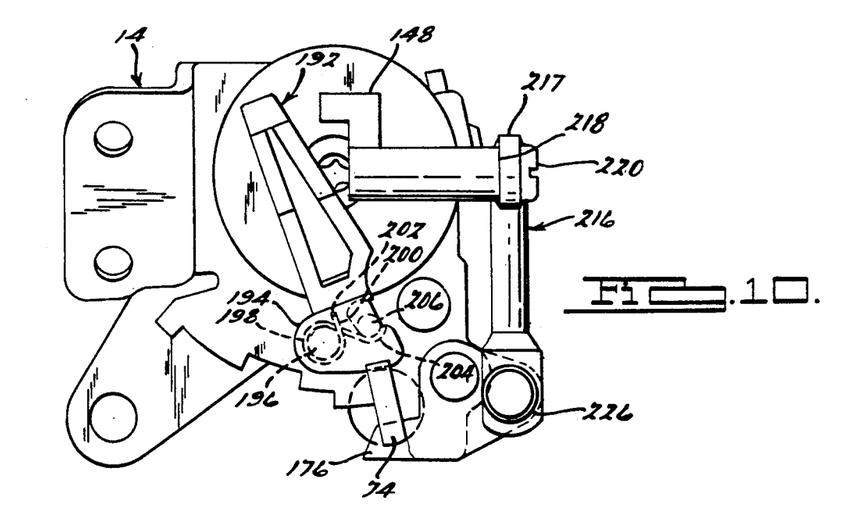
FIG. 10 is a view taken along the plane of the line 10—10 of FIG. 8, and looking in the direction of the arrows.
Figures 11, 12:
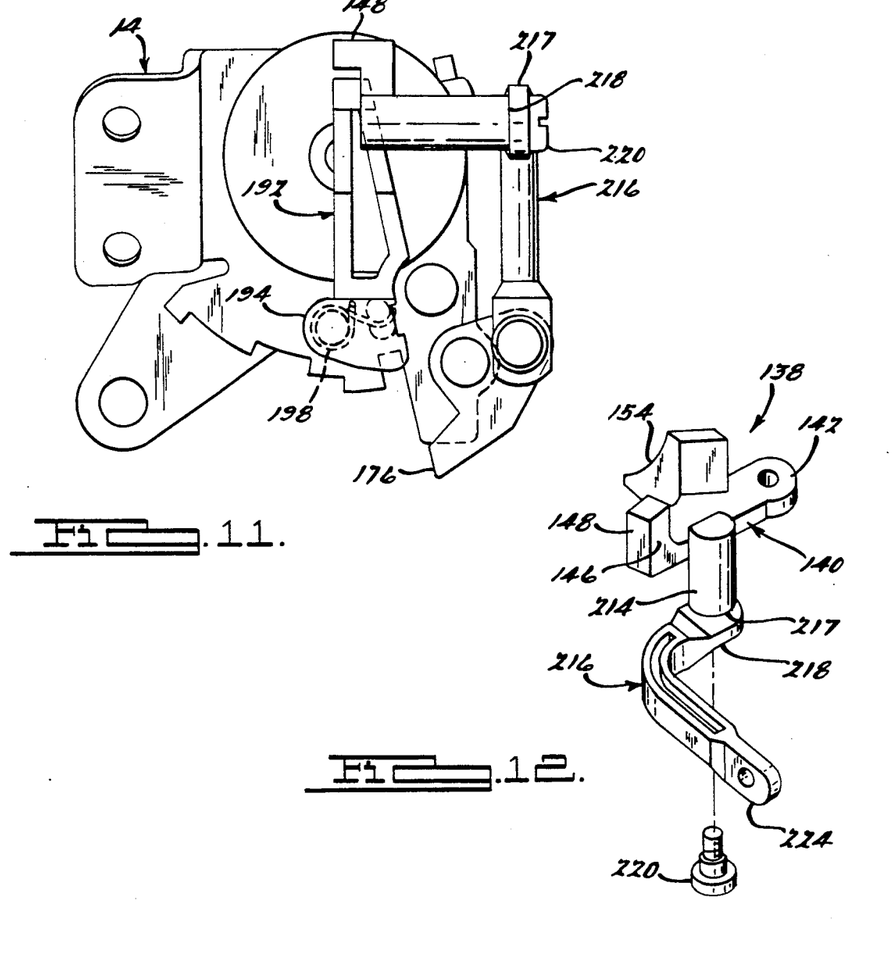
FIG. 11 is a view similar to FIG. 10, but illustrating a different operational position.
FIG. 12 is a perspective view of a portion of the FIG. 10 structure.

Thereafter, manual depression of the hand grip 70 (FIG. 1), against the force of the central U-shaped wire portion 86 (FIGS. 2 and 2A), serves to lift the flat terminal end 74 laterally out of the Park detent 102. As shown in FIGS. 6 and 7, once free of the inner surface of the planar body portion 18, the hand grip 70 may be rotated to position the end 74 adjacent any of the other gate detents 104, 106, 108, 110, and 112, and then relaxed to be urged across same by the force of the spring assembly 77, for a different selected gear shift position. The manual depression and rotation operation is repeated for other selected shift positions.

For any position of the end 74 other than in the Park slot 102, the arcuate outer surface of the partial circle abutment 21 will block the projection 146 (FIG. 7), to thus prevent the return of the key 120 to its release position, where it can be removed from the key cylinder 118. When this occurs, the projection 162 moves down in front of the edge of the abutment 21, and the extension 180 of the blocker member 176 into the slot 182, preventing removal of the end 174 and, hence, the shift lever 50, from Park.

Referring now to the preferred alternate embodiment shown in FIGS. 8-12, a steel washer 184 (FIG. 9) serves to secure the shift lever unit 20 to the integral gate and mounting bracket 14, by an attaching screw 186 and anti-rotational holes 188 and cooperating projections 190 on the shift lever unit 20. This is in lieu of the C-clip 28 of FIG. 2.

A key inhibit blocker 192 is pivotally mounted at one perforated end 194 thereof by a pivot pin 196 secured to the bracket 14. A spring 198 is mounted around the pin 196, with one extended end 200 (FIG. 11) bent into a hole 202 in the member 192, and the other extended end 204 hooked around a fixed pin 206. The key inhibit blocker 192 is formed to include an abutment 208 adjacent the perforated end 194, a leg 209 which includes an intermediate bend 210 (FIG. 8) adapted to pass over the attaching screw 186, and a distal end 212 for a purpose to be described. The inhibit blocker 192 replaces the partial circle abutment 21 shown in FIGS. 4-7.

In lieu of the projection 162 shown in FIGS. 4-7, a leg 214 (FIG. 12) is formed on the edge of the body portion 140 of the actuator member 138. In lieu of the linkage rod 166 of FIGS. 4-7, but serving the same function, an inhibit rod 216 (FIGS. 10-12) is used between the end face 217 of the leg 214 and the blocker member 176. The inhibit rod 216 is formed to include a first flat perforated end 218 pivotally secured by a suitable fastener 220 to the end face 218, a center section 222 formed in a 90° bend (FIG. 12), and a second flat perforated end 224 pivotally secured by a suitable fastener 226 to the blocker member 176.

In operation, similarly to the embodiment of FIGS. 1-7, the key 120 is inserted in the key cylinder 118 and rotated from the lock position, thereby, via the fingerlike projection 126 and the actuator member 138, causing the leg 214 to move the inhibit rod 216. The latter serves to pivot the blocker member 176 away from the slot 182 to thus free the terminal end 74 of the shift lever 50. The terminal end 74 is thus free to be pivoted out of the Park detent 102 and selectively rotated to one of the other shift position detents 104, 106, 108, 110 and 112. Such movement of the shift lever 50 out of the Park detent 102 releases the abutment 208 of the inhibit blocker 192 in a counterclockwise direction in FIG. 11. This movement positions the distal end 212 adjacent the projection 146 of the actuator member 138 such that the key 120 cannot be returned to its release position until the terminal end 74 of the shift lever 50 is returned to the Park detent 102, to thereby once again engage the abutment 208 to pivot the inhibit blocker 192 and urge it, against the force of the spring 198, away from the projection 146.

Industrial Applicability

It should be apparent that the invention provides an improved, compact and efficient ignition interlock mechanism for a column mounted shift control arrangement for both preventing removal of the shift control mechanism from the Park detent to other shift positions prior to unlocking the ignition lock, and preventing rotation of the key cylinder to remove the key therefrom prior to the shift lever being returned to the Park detent.

While but two embodiments of the invention have been shown and described, other modifications thereof are possible within the scope of the following claims.

What is claimed is:

1. In a transmission shift control assembly mounted on a vehicle steering column and including a detent plate having a plurality of detents formed thereon including a Park detent, a shift lever having an end thereof pivotable into and out of the Park detent and rotatable to selected detents, a key cylinder rotatable by a key, an ignition interlock mechanism comprising a pivotally mounted actuator member adapted to being pivoted upon rotation of said key cylinder by said key, a blocker member pivotally mounted on said detent plate, linkage means operatively connected between said actuator member and said blocker member to position said blocker member so as to prevent said end of said shift lever from being pivoted out of said Park detent until said key cylinder is rotated by said key.

2. The ignition interlock mechanism described in claim 1, and a shift control unit rotatable by said shift lever, and an extension formed on said shift control unit adaptable to preventing said actuator member from being pivoted while said shift lever is out of Park, thereby preventing removal of said key from said key cylinder until said end of said shift lever is returned to its Park position.

3. The ignition interlock mechanism described in claim 2, wherein said actuator member includes a body portion pivotally mounted at one end thereof, and having a projection formed at the other end thereof, an arcuate shaped projection extending from one central edge thereof adapted to being engaged by said key cylinder, and a further projection extending from an opposite central edge thereof for pivotally securing one end of said linkage means.

4. The ignition interlock mechanism described in claim 1, wherein said linkage means comprises a rod whose other end is pivotally connected to said blocker member so as to pivotally actuate same.

5. The ignition interlock mechanism described in claim 3, and a notch formed in an edge of said end of said shift lever adapted to receive said blocker member upon rotation of said key and, hence, rotation of said key cylinder, said arcuate shaped projection, and said linkage means, after the return of said shift lever to the Park detent.

6. The ignition interlock mechanism described in claim 5, and a projection formed on an extension of said key cylinder for engaging said arcuate shaped projection.

7. The ignition interlock mechanism described in claim 3, wherein said extension formed on said shift control unit is a partial circle extension having (1) an edge thereof cooperable with said projection on the end of said body portion to block the rotation of said shift lever until the key is rotated from its release position to thereby move said rod to pivot said blocker member away from said end of said shift lever, and (2) an outer surface thereof cooperable with said projection on the end of said body portion to block the rotation of the key cylinder by the key until the shift lever is returned to Park position.

8. The ignition interlock mechanism described in claim 1, and a spring-loaded key inhibit blocker pivotally mounted on said detent plate adaptable to preventing said actuator member from being pivoted until said shift lever is returned to the Park position to thereby abut against and pivot said key inhibit blocker and free said actuator member and thus permit the key cylinder to be rotated to the key release position.

9. The ignition interlock mechanism described in claim 3, wherein said rod is a linkage rod having the ends thereof pivotally extended through respective openings formed in said further projection and in said blocker member.

10. The ignition interlock mechanism described in claim 3, wherein said rod is an inhibit rod having flat ends formed thereon connected by respective pivot pins to said further projection and to said blocker member.

* * * * *